(12) United States Patent
Sampson

(10) Patent No.: US 8,662,457 B2
(45) Date of Patent: *Mar. 4, 2014

(54) GROMMETED CLAMP ASSEMBLY

(71) Applicant: Franklin Fastener Company, Redford, MI (US)

(72) Inventor: James M. Sampson, Southfield, MI (US)

(73) Assignee: Franklin Fastener Company, Redford, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/733,183

(22) Filed: Jan. 3, 2013

(65) Prior Publication Data

US 2013/0117971 A1 May 16, 2013

Related U.S. Application Data

(63) Continuation of application No. 12/714,845, filed on Mar. 1, 2010, now Pat. No. 8,439,317.

(60) Provisional application No. 61/156,075, filed on Feb. 27, 2009.

(51) Int. Cl.
F16L 3/00 (2006.01)

(52) U.S. Cl.
USPC ............. 248/74.4; 248/62; 248/73; 248/74.3

(58) Field of Classification Search
USPC ................... 248/62, 63, 73, 74.1, 74.3, 74.4; 24/530, 542, 543; 411/501, 508
See application file for complete search history.

(56) References Cited

U.S. PATENT DOCUMENTS

| | | | |
|---|---|---|---|
| 1,805,006 A | | 5/1931 | Neilon |
| 2,399,899 A | * | 5/1946 | Tinnerman ................ 174/40 CC |
| 2,922,733 A | | 1/1960 | Henning |
| 3,848,839 A | | 11/1974 | Tillman |
| 4,252,289 A | | 2/1981 | Herb |
| 4,338,707 A | | 7/1982 | Byerly |
| 4,360,178 A | * | 11/1982 | Senter et al. ................. 248/74.1 |
| 4,460,139 A | | 7/1984 | Bochen et al. |
| 4,991,801 A | | 2/1991 | Trumbull |
| 5,129,608 A | | 7/1992 | Goldman |
| 5,180,124 A | | 1/1993 | Pascor |
| 5,435,506 A | | 7/1995 | Wiley |

(Continued)

OTHER PUBLICATIONS

Non-Final Office Action dated Aug. 9, 2012 for U.S. Appl. No. 12/731,940, filed Mar. 25, 2010, 18 pgs.

*Primary Examiner* — Steven Marsh
(74) *Attorney, Agent, or Firm* — Brooks Kushman P.C.

(57) ABSTRACT

A clamp assembly is provided with a first clamp portion and a second clamp portion. The first clamp portion includes a first anchoring end, a first interlocking end with an interlocking aperture projecting therethrough, and a first curved portion formed between the first anchoring end and the first interlocking end. The second clamp portion includes a second anchoring end that is configured for alignment with the first anchoring end, a second interlocking end that is received by the interlocking aperture of the first interlocking end, and a second curved portion that cooperates with the first curved portion to collectively form a support. The second interlocking end includes a tab having a transverse orientation for insertion into the interlock aperture, that is sized to extend beyond a width of the interlock aperture when plastically deformed for locking the second clamp portion to the first clamp portion.

6 Claims, 4 Drawing Sheets

(56) References Cited

U.S. PATENT DOCUMENTS

| | | |
|---|---|---|
| 5,971,330 A | 10/1999 | Noba et al. |
| 6,561,471 B1 | 5/2003 | Hawie |
| 6,595,472 B1 | 7/2003 | Pisczak |
| 6,669,150 B2 | 12/2003 | Benoit et al. |
| 6,676,091 B2 | 1/2004 | Hauer |
| 6,892,990 B2 | 5/2005 | Pisczak |
| 7,258,304 B2 * | 8/2007 | Miener .................... 244/129.1 |
| 7,467,767 B2 | 12/2008 | Miles et al. |
| 7,546,986 B2 | 6/2009 | Kim |
| 7,770,848 B2 | 8/2010 | Johnson et al. |
| 7,959,114 B2 | 6/2011 | Spreitzer et al. |
| 8,091,839 B2 | 1/2012 | Whipple et al. |
| 2002/0179780 A1 | 12/2002 | Benoit et al. |
| 2004/0238698 A1 | 12/2004 | Shereyk et al. |
| 2005/0098688 A1 | 5/2005 | Miarka et al. |
| 2006/0213039 A1 | 9/2006 | Sampson |
| 2007/0272806 A1 | 11/2007 | Kim |
| 2009/0079208 A1 * | 3/2009 | Mizuno et al. ................ 292/340 |

* cited by examiner

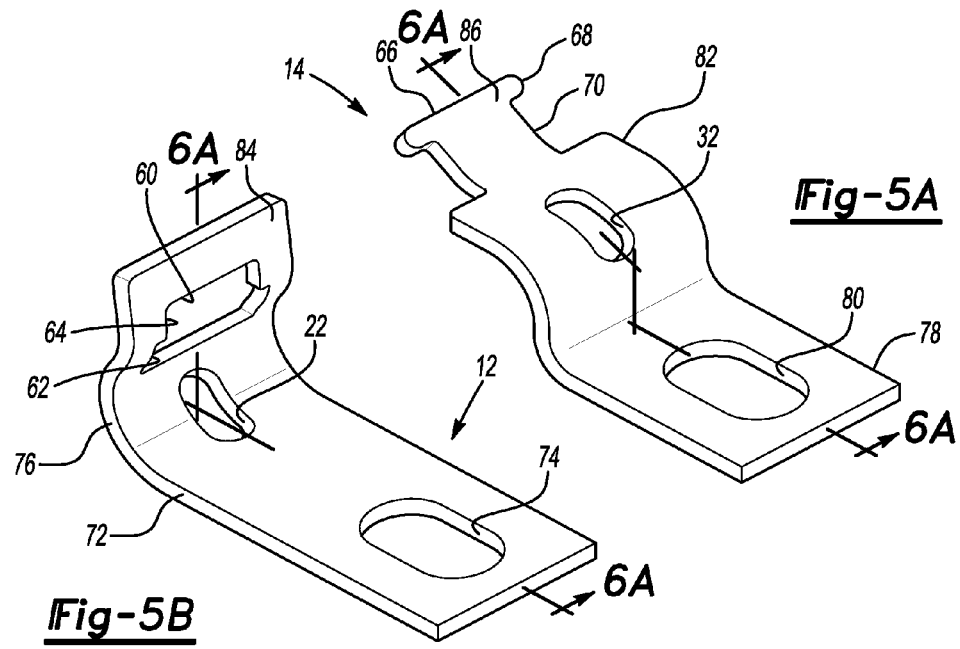
*Fig-5A*
*Fig-5B*
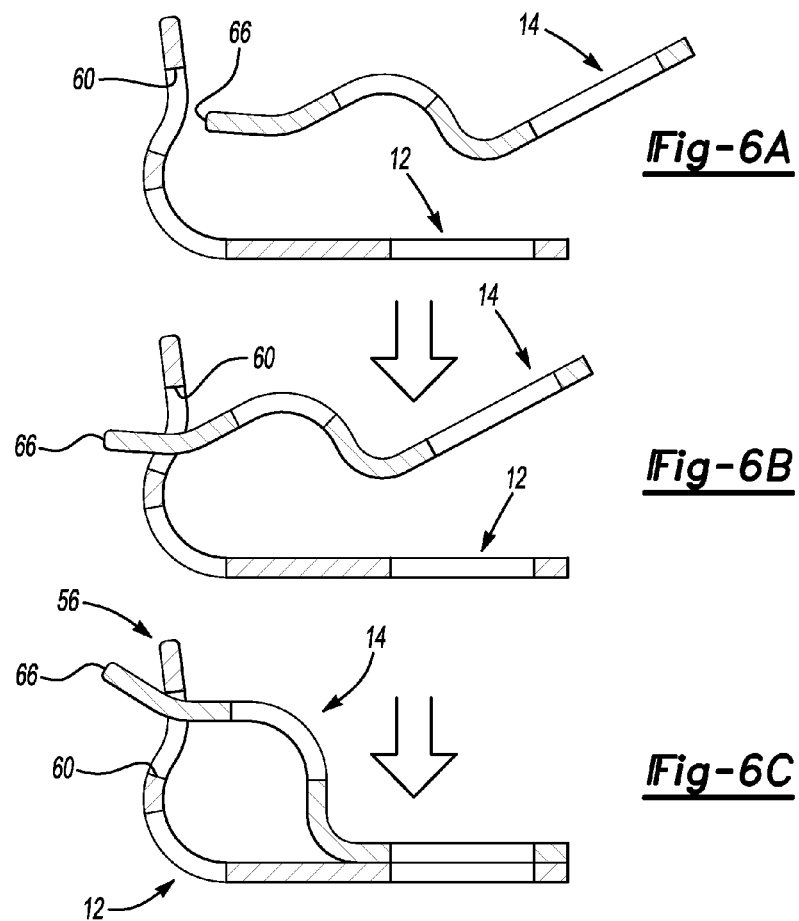
*Fig-6A*
*Fig-6B*
*Fig-6C*

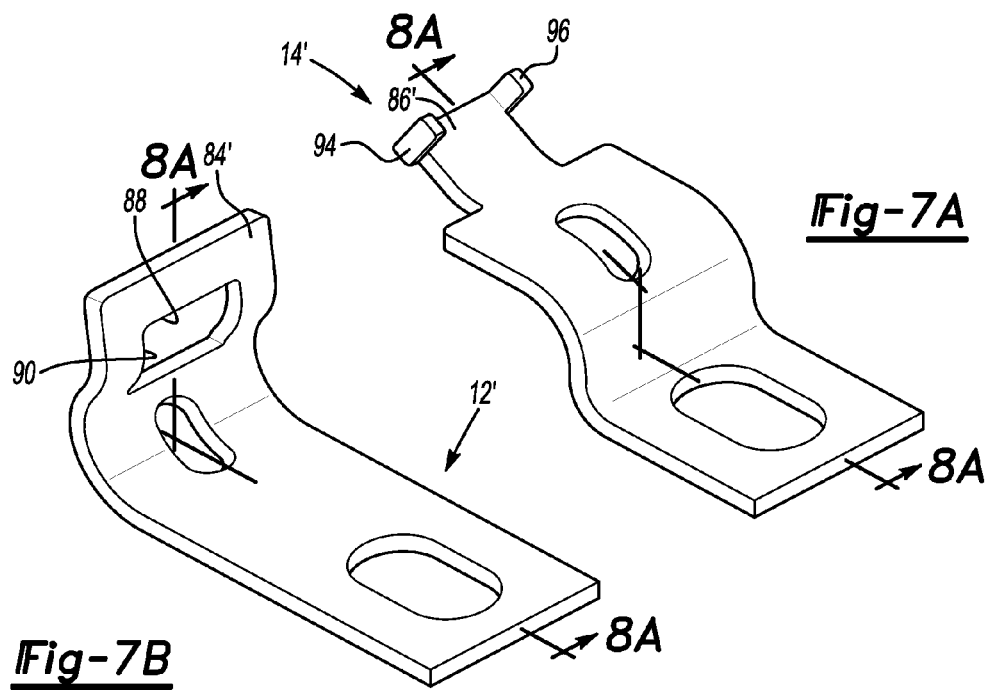
*Fig-7A*
*Fig-7B*
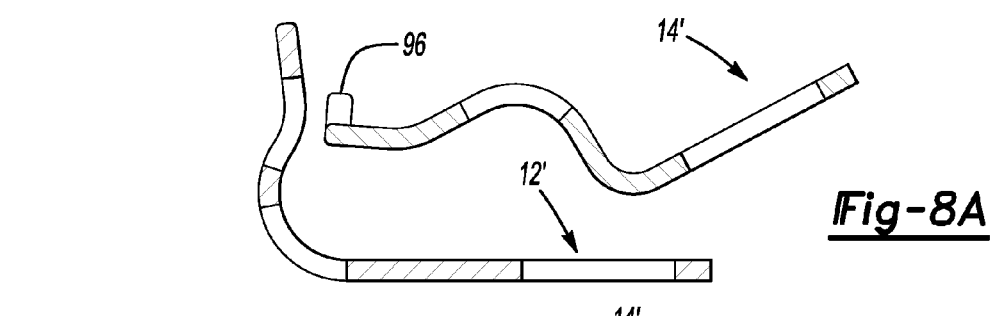
*Fig-8A*
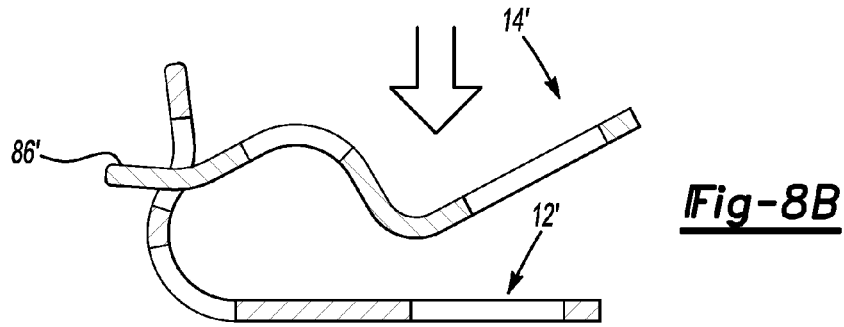
*Fig-8B*
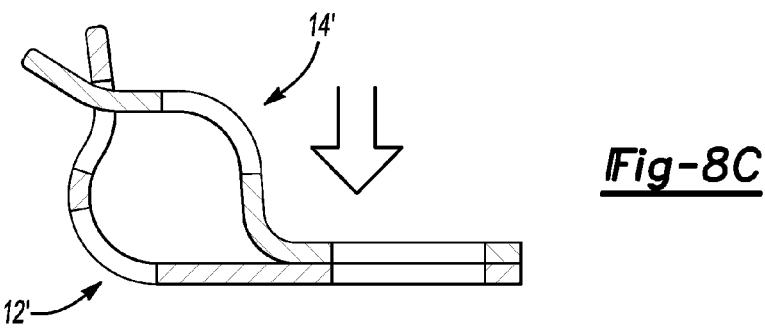
*Fig-8C*

GROMMETED CLAMP ASSEMBLY

CROSS-REFERENCE TO RELATED APPLICATIONS

This application is a continuation of U.S. application Ser. No. 12/714,845 filed Mar. 1, 2010, now U.S. Pat. No. 8,439,317 granted on May 14, 2013, which, in turn, claims the benefit of U.S. provisional Application No. 61/156,075 filed Feb. 27, 2009. The disclosures of which are incorporated in their entirety by reference herein.

TECHNICAL FIELD

The field relates to clamps for tubes, pipes, hoses, ducts, lines, cables and harnesses.

BACKGROUND

Clamps are devices used to secure articles to a supporting surface. One type of clamp is a tube clamp, that is used to engage and secure a tubular article to a supporting surface. The tubular article may be a pipe, hose, duct, line, cable or harness. The supporting surface may be an engine block or chassis member for a vehicular application, or a wall or beam for a architectural application.

In vehicle applications clamps are used to secure hydraulic, pneumatic, mechanical and electrical tubes. Hydraulic tubes or lines are commonly used for a variety of systems including: brake systems, fuel systems, heating, ventilation and air conditioning (HVAC) systems and power steering systems. Common systems using pneumatic tubes or hoses include: lift, leveling and stabilizing systems. Mechanical tubes or cables are commonly used on a variety of systems including: hood and trunk release cables, parking brake cables and shifter cables. Electrical tubes or harnesses connect the various electrical systems and components on the vehicle including: power generation and storage, controllers and sensors. A variety of clamps are currently used to secure these tubes on a vehicle.

Metal clamps are often used for rigid attachment of heavy tubes in demanding environments, whereas plastic straps are often used for flexible attachments. A metal clamp may damage a tube if it is not properly assembled and does not properly engage the tube. If there is any clearance between the clamp and the tube when retained, then noise or wear of the tube may develop over time. Plastic straps are elastic and conform to the exterior shape of a tube, which may prevent wear. However, plastic straps typically do not have the strength to support larger tubes and the plastic straps are not suited for high temperature applications.

Grommeted clamps have been developed for applications requiring the high strength of a metal clamp and elasticity of a plastic strap. These clamps typically include an elastic material that conforms to the exterior of a tube with a metal bracket to clamp around the elastic material and anchor the tube to a supporting surface.

One common approach for a grommeted clamp includes shipping the metal portions along with an elastic grommet as individual components, where one assembles the grommeted clamp assembly prior to securing the tube. This approach can be time intensive, and can lead to potential problems if the grommeted clamp is not assembled properly.

Another approach for a grommeted clamp assembly includes over molding an elastic material to a metal clamp subassembly, then providing a single grommeted clamp assembly to the user. This approach saves assembly time at the plant, however many products that are currently available do not properly secure the tube.

One example of an over molded grommeted clamp assembly that does not properly secure the tube includes a metal clamp that is over molded with elastic material while it is in an open position. Once the grommeted clamp assembly is closed around a tube, the cavity formed by the elastic material is of an irregular shape and does not conform to the exterior portion of the tube. The clearance between the grommeted clamp assembly and the tube may result in wear to the tube and objectionable noise.

Another example of an over molded grommeted clamp assembly that does not properly secure the tube includes a metal clamp that is over molded with elastic material while it is in a closed position. The elastic material resists plastic deformation, and results in a grommeted clamp that is difficult for a user to open and engage the tube during assembly.

SUMMARY

In one embodiment, a clamp assembly is provided with a first clamp portion and a second clamp portion. The first clamp portion includes a first anchoring end for resting upon an underlying surface, a first interlocking end with an interlocking aperture projecting therethrough, and a first curved portion formed between the first anchoring end and the first interlocking end. The second clamp portion includes a second anchoring end that is configured for alignment with the first anchoring end, a second interlocking end that is received by the interlocking aperture of the first interlocking end, and a second curved portion that cooperates with the first curved portion to collectively form a support having a generally cylindrical shape. The second interlocking end further comprises at least one tab having a transverse orientation for insertion into the interlock aperture, the tab being sized to extend beyond a width of the interlock aperture when plastically deformed for locking the second clamp portion to the first clamp portion.

In another embodiment, a method is provided for securing an elongated member to an underlying surface with a clamp assembly. A first clamp portion is formed with a first anchoring end, a first curved portion and a first interlocking end. The first interlocking end having a slot with a width. A second clamp portion is formed with a second anchoring end, a second curved portion and a second interlocking end. The second interlocking end includes a notched end with a pair of transverse tabs. The notched end is inserted into the slot. The tabs are plastically deformed to extend beyond the width of the slot, thereby locking the second clamp portion to the first clamp portion.

In yet another embodiment, a clamp assembly is provided with a first clamp portion and a second clamp portion. The first clamp portion includes a first anchoring end, a first interlocking end, and a first curved portion formed between the first anchoring end and the first interlocking end. The second clamp portion includes a second anchoring end that is configured for alignment with the first anchoring end, a second interlocking end, and a second curved portion formed between the first anchoring end and the first interlocking end. The second curved portion cooperates with the first curved portion to collectively form a cylindrical support. One of the first interlocking end and the second interlocking end includes an interlock aperture formed therethrough, and the other of the first interlocking end and the second interlocking end forms a notched end. The interlock aperture is sized for receiving the notched end. The notched end includes a distal portion extending transversely beyond the interlock aperture for locking the first clamp portion to the second clamp portion.

BRIEF DESCRIPTION OF THE DRAWINGS

FIG. 5A is a perspective view of a second clamp portion of the grommeted clamp assembly of FIG. 1;

FIG. 5B is a perspective view of a first clamp portion of the grommeted clamp assembly of FIG. 1;

FIG. 6A is a section view of the first and second clamp portions of FIGS. 5A and 5B taken along section lines 6A-6A, shown in an initial assembly position;

FIG. 6B is another section view of the first and second clamp portions of FIGS. 5A and 5B taken along section lines 6A-6A, shown in an intermediate assembly position;

FIG. 6C is yet another section view of the first and second clamp portions of FIGS. 5A and 5B taken along section lines 6A-6A, shown in an assembled position;

FIG. 7A is a perspective view of a second clamp portion according to another embodiment of the present invention;

FIG. 7B is a perspective view of a first clamp portion according to the embodiment illustrated in FIG. 7A;

FIG. 8A is a section view of the first and second clamp portions of FIGS. 7A and 7B taken along section lines 8A-8A, shown in the initial assembly position;

FIG. 8B is another section view of the first and second clamp portions of FIGS. 7A and 7B taken along section lines 8A-8A, shown in the intermediate assembly position; and FIG. 8C is yet another section view of the first and second clamp portions of FIGS. 7A and 7B taken along section lines 8A-8A, shown in the assembled position.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
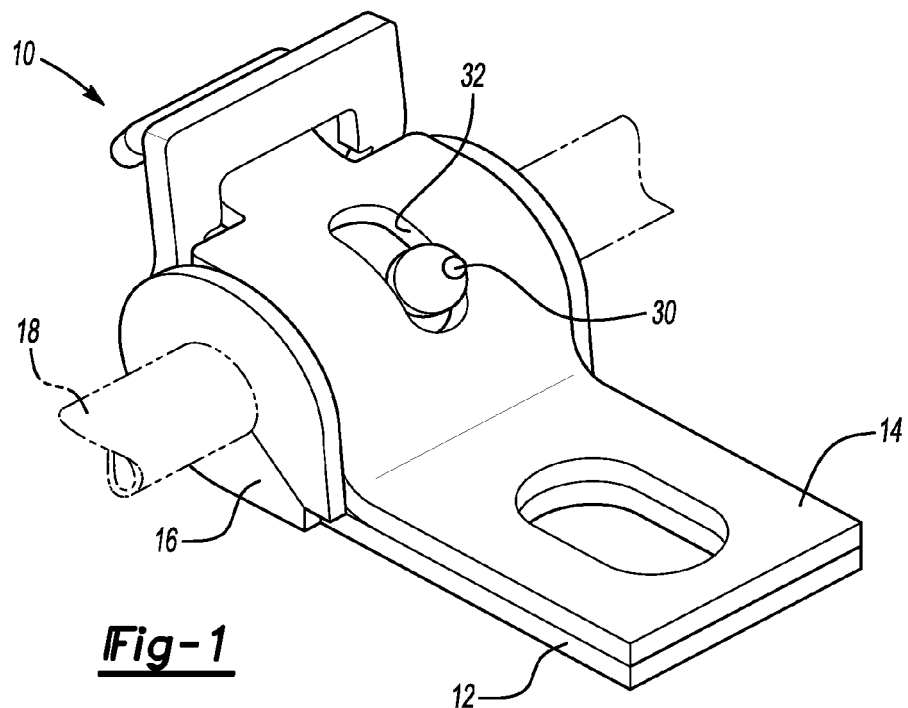
FIG. 1 is a perspective view of a grommeted clamp assembly according to an embodiment of the present invention, illustrated supporting an elongated member.

With reference to FIG. 1, a grommeted clamp assembly is illustrated in accordance with an embodiment of the present invention and is referenced by numeral 10. The grommeted clamp assembly 10 includes a first clamp portion 12 and a second clamp portion 14, which are assembled about a grommet 16. Once assembled, the grommeted clamp assembly 10 is fastened to a supporting surface to secure a tube 18. The grommeted clamp assembly may be used to secure a variety of tubes including: pipes, hoses ducts, lines, cables and harnesses. An exemplary example of one such application of a grommeted clamp assembly is to secure fuel lines on an automotive vehicle.

Figure 2:
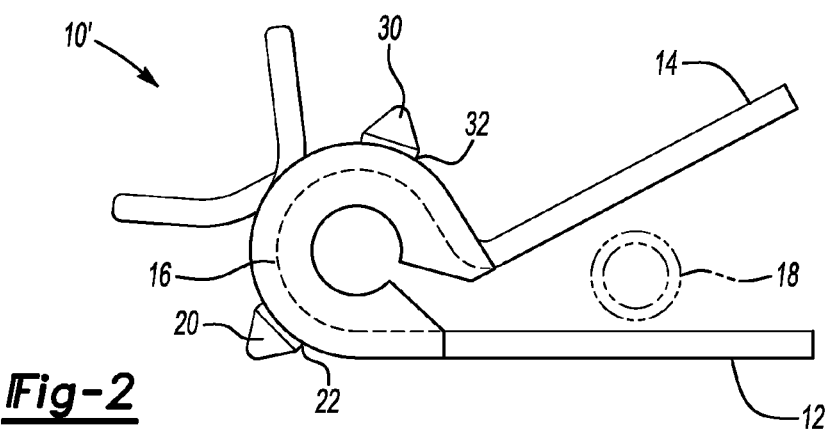
FIG. 2 is a side elevation view of the grommeted clamp assembly of FIG. 1, illustrated in an open assembly position.
Figure 3:
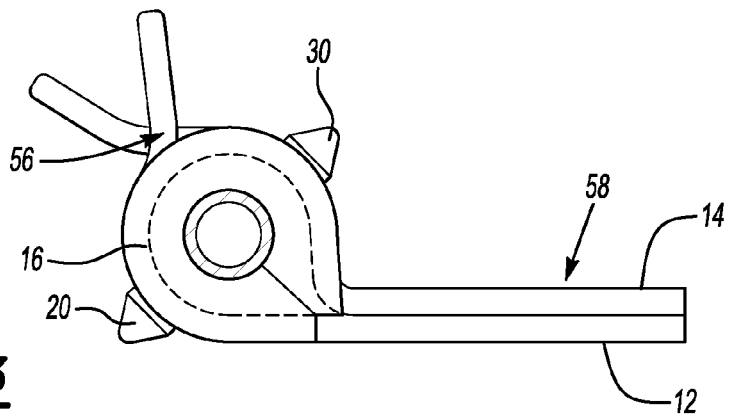
FIG. 3 is a side elevation view of the grommeted clamp assembly of FIG. 1, illustrated in a closed assembly position.

Referring to FIGS. 2 and 3 the grommeted clamp assembly 10 is shown in the open position in FIG. 2 and the closed position in FIG. 3. The grommeted clamp assembly 10 is provided to the user as a single unit. For installation, the user first opens the grommeted clamp assembly 10' by separating the second clamp portion 14 from the first clamp portion 12 as illustrated in FIG. 2. Then the user engages the tube 18 with the open grommeted clamp assembly 10'. Once the user releases the clamp portions the grommeted clamp assembly returns to the closed position to retain the tube 18, as illustrated in FIG. 1. Then the user secures the grommeted clamp assembly 10 to a supporting surface using a fastener (not shown).

Referring to FIGS. 1-3 and 4C, the grommet 16 is attached to the first clamp portion 12 by a first projection 20 through a first elongated slot 22. The projection includes cylindrical shaft 24 with a conical head 26. The diameter of a base 28 of the first conical head 26 has a larger diameter than the diameter of the cylindrical shaft 24. The width of the elongated slot 22 is a dimension greater than the diameter of the cylindrical shaft 24, and the width is smaller than the dimension of the diameter of the base 28. The grommet 16 is made of a flexible material such that when the first projection 20 is inserted into the first elongated slot 22, the conical head 26 and base 28 elastically deform and pass through the first elongated slot 22. The base 28 has a diameter that is larger than the width of the first elongated slot 22 and after passing through the slot the conical head 26 and base 28 return to their normal dimensions to retain the grommet 16 on the first clamp portion 12. In a similar fashion, the grommet 16 is attached to the second clamp portion 14 by a second projection 30 and its interaction with a second elongated slot 32.

Figure 4A:
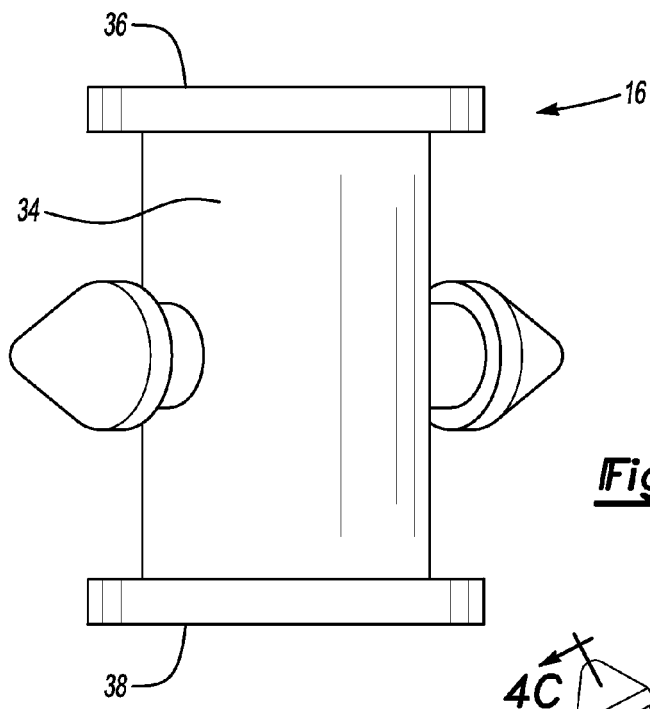
FIG. 4A is a top plan view of a grommet of FIG. 1.
Figure 4B:
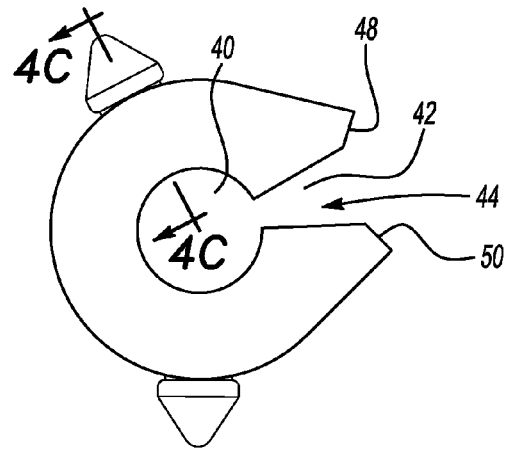
FIG. 4B is a side elevation view of the grommet of FIG. 1.
Figure 4C:
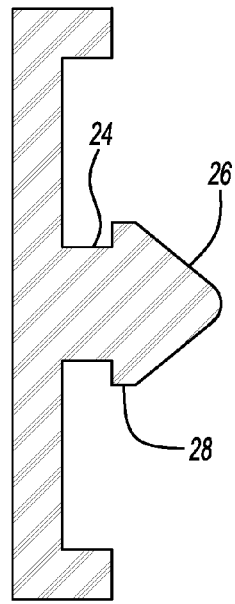
FIG. 4C is a cross-sectional view of the grommet of FIGS. 4A and 4B taken along section line 4C-4C.
Figure 4D:
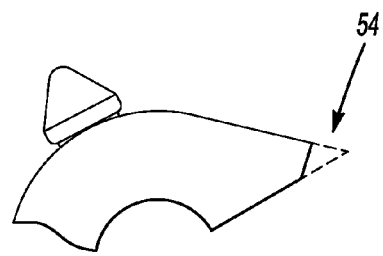
FIG. 4D is a fragmented view of the grommet of FIG. 4B.

With reference to FIGS. 4A-4C, the grommet 16 has a body 34 that is tubular in shape with a first end 36 and a second end 38 that opposes the first end 36. The diameter of both the first end 36 and the second end 38 are larger than the diameter of the body 34. The perpendicular dimension between the first and second end is greater than the width of the first and second clamp portions 12 and 14. These parameters allow the first and second ends 36 and 38 to position the first and second clamp portions 12 and 14 during the assembly of the grommeted clamp 10 to the clamp portions.

The inner diameter of the grommet 16 forms a cylindrical cavity 40 that extends from the first end 36 to the second end 38. The grommet 16 has an ovate cross sectional shape, whereby an opening 42 is formed along the length of the grommet 16 at the tip 44.

In reference to FIGS. 4A-4D, the grommet 16 is a molded elastic material, such as EPDM, Neoprene, Silicone, HNBR, Nitrile or Viton®. The material selected will preferably have a Shore Durometer Hardness between 60-80 Shore A. The grommet 16 is "molded open", as seen in FIG. 4B, with the opening 42 incorporated into the mold, as opposed to cutting the opening 42 after the mold process. By incorporating the opening 42 into the mold process, a first lead-in surface 48 and opposing second lead-in surface 50 are created. The function of these lead-in surfaces is to replace a ledge 54, that would be present if the opening 42 in the grommet 16 was cut after molding. During assembly, when the user engages the tube with the grommeted clamp assembly, a user could inadvertently contact the tube 18 against the ledge 54, and dislodge the grommet 16 from the clamp portions. By incorporating the opening 42 into the mold process, the ledge 54 can be eliminated and this potential problem is avoided. Alternative embodiments of the grommet 16 are envisioned where the grommet 16 is "molded closed". This molded closed grommet 16, would still include opening 42, however the gap between opposing sides of the grommet 16 would be reduced.

Referring to FIGS. 1-4C, the grommet 16 is molded with an opening 42 in a position illustrated in FIG. 4B. When the grommet 16 is elastically deformed to a different position, the internal stress created within the grommet will oppose the deformation. This internal stress helps prevent the grommeted clamp assembly from disassembling during shipping. When the user opens the grommeted clamp assembly 10' as illustrated in FIG. 2, the grommet 16 provides an opposing force that is reacted through the projections 20 and 30 to the clamp portions 12 and 14. These forces in combination with the lead in features 48 and 50 create a "Snap-fit" as the grommeted clamp assembly 10 engages a tube 18. This "Snap-fit" provides positive feedback to confirm proper assembly to the tube.

With reference to FIG. 3, the clamp portions of the grommeted clamp assembly 10 include an interlocking end 56 and an anchoring end 58. The first clamp portion 12 and second clamp portion are retained in an interlocked position by the grommet 16 as previously described. After the grommeted clamp assembly engages the tube 18, the grommeted clamp assembly 10 is secured to a supporting surface by a fastener at the anchoring end 58.

Referring to FIGS. 5A, 5B and 6C, the first clamp portion 12 and second clamp portion 14 interlock to form a clamp portion subassembly as shown in FIG. 6C. The clamp portion subassembly includes a interlocking end 56 and an anchoring end 58.

In reference to FIG. 5B, the first clamp portion 12 includes a first anchoring end 72, with a first fastener receiving opening 74. The first clamp portion 12 has a first interlocking end 84 with a stepped slot 60 that has a first slot width 62 and a second slot width 64. The first slot width 62 has a greater width dimension than the second slot width 64. The first clamp portion 12 includes a first curved portion 76 that has a first elongated slot 22. The first curved portion 76 connects the first anchoring end 72 to the first interlocking end 84.

Referring to FIG. 5A, the second clamp portion 14 includes a second anchoring end 78, with a second fastener receiving opening 80. The second clamp portion 14 has a second interlocking end 86 including a notched end 66. The notched end 66 has an outer width 68 and an inner width 70, whereby the outer width 68 has a greater width dimension than the inner width 70. The outer width 68 has a width dimension that is smaller than the first slot width 62 and larger than the second slot width 64. The inner width 70 has a width dimension that is smaller than the width dimension of both the first and second slot widths 62 and 64. The second clamp portion includes a second curved portion 82 with a second elongated slot 32. The second curved portion 82 connects the second anchoring end 78 to the second interlocking end 86.

During the assembly of the clamp portions to each other, first the notched end 66 of the second clamp portion 14 is positioned with the outer width 68 aligned to the first slot width 62 of the stepped slot 60 as shown in FIG. 6A. As shown in FIG. 6B, the first slot width 62 of the stepped slot 60 receives the outer width 68 of the notched end 66 as the second clamp portion 14 is inserted into the first clamp portion 12. Then the clamp portions are moved into their interlocked positions by translating the inner width 70 of the notched end 66 upwards into the second slot width 64, while pivoting the second clamp portion 14 about the interlocking end 56 towards the first clamp portion 12 at the anchoring end 58 as shown in FIG. 6C. The two clamp portions are interlocked, however they can be easily unlocked or disassembled by reversing the assembly process. Once the grommet 16 is attached to the clamp portions as previously described, the grommeted clamp assembly resists disassembly.

FIGS. 7A-8C describe another embodiment of the invention with additional steps added to the assembly process of the first clamp portion 12' to the second clamp portion 14'. These additional steps allow the clamp portions to be securely interlocked to each other prior to their attachment to the grommet 16.

The first clamp portion 12' includes a first interlock aperture 88 that has an aperture width 90 of a uniform dimension. The second clamp portion 14' includes a second interlocking end 86' with a first ear 94 and a second ear 96. During the assembly of the clamp portions to each other, the second interlocking end 86' of the second clamp portion 14' is aligned with the aperture width 90 of the interlock aperture 88 as shown in FIG. 8A. Next the interlock aperture 88 receives the second interlocking end 86' as the second clamp portion 14' is inserted into the first clamp portion 12' as shown in FIG. 8B. The first and second ears 94 and 96 of the second interlocking end are then plastically deformed to be coplanar with the second interlocking end 86'. After bending, the first and second ears 94 and 96 resemble the notched end of the second clamp portion shown in FIG. 5A. The width dimension of the coplanar ears is wider than the width dimension of the interlock aperture 88. The coplanar ears extend across the aperture width 90 to hold the first and second clamp portions 12' and 14' together.

The embodiment illustrated in FIGS. 7A-8C allows the clamp portions 12' and 14' to be assembled together as a sub assembly that can be subjected to secondary manufacturing operations prior to the attachment of the grommet 16. For example, the sub assembly can be heat treated or plated prior to the installation of the grommet. Since clamp portions 12' and 14' are securely interlocked together, alternate clamp assembly embodiments are envisioned, containing clamp portions 12' and 14' without a grommet 16.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A clamp assembly comprising:
   a first clamp portion having a first anchoring end for resting upon an underlying surface, a first interlocking end with an interlocking aperture projecting therethrough, and a first curved portion formed between the first anchoring end and the first interlocking end; and
   a second clamp portion having a second anchoring end configured for alignment with the first anchoring end, a second interlocking end being received by the interlocking aperture of the first interlocking end, and a second curved portion cooperating with the first curved portion to collectively form a support having a generally cylindrical shape; and
   a grommet having a body with a pair of flanges extending radially from opposing ends of the body with an opening extending lengthwise along the body, the opening sized for receiving an elongated member, the grommet having at least one transverse projection extending from a central portion of the body, wherein at least one of the first curved portion and the second curved portion includes an elongated slot for receiving the at least one transverse projection for retaining the grommet;

wherein the second interlocking end further comprises at least one tab having a transverse orientation for insertion into the interlock aperture, the tab being sized to extend beyond the interlock aperture when plastically deformed into a coplanar orientation for locking the second clamp portion to the first clamp portion;

wherein the at least one transverse projection further comprises a pair of transverse projections that are oriented generally diametrically opposite one another when the grommet is in a closed position; and wherein each projection further comprises a shaft with a distal head, each head having a diameter sized larger than a shaft diameter and smaller than an elongated slot width for retaining the grommet to each of the first clamp portion and the second clamp portion.

2. The assembly of claim 1 wherein the at least one tab further comprises a pair of tabs, the tabs being aligned coplanar relative to each other when plastically deformed.

3. The assembly of claim 2 wherein the tabs extend in opposing directions from each other when plastically deformed.

4. The assembly of claim 1 wherein the interlock aperture is formed in a generally rectangular shape with a transverse width and a longitudinal length, wherein the width is greater than the length and wherein the tab is sized to extend beyond the width of the interlock aperture when plastically deformed for locking the second clamp portion to the first clamp portion.

5. The assembly of claim 1 wherein the grommet further comprises an open molded grommet having a cavity formed therein for receiving the elongated member.

6. The assembly of claim 1 wherein each of the first curved portion and the second curved portion include an elongated slot for receiving one of the transverse projections, and wherein a width of each curved portion is sized for orientation between the pair of flanges.

\* \* \* \* \*